March 11, 1947.
C. WILLIAMS
2,417,338
FOUR WHEEL TRAILER
Filed Jan. 25, 1946
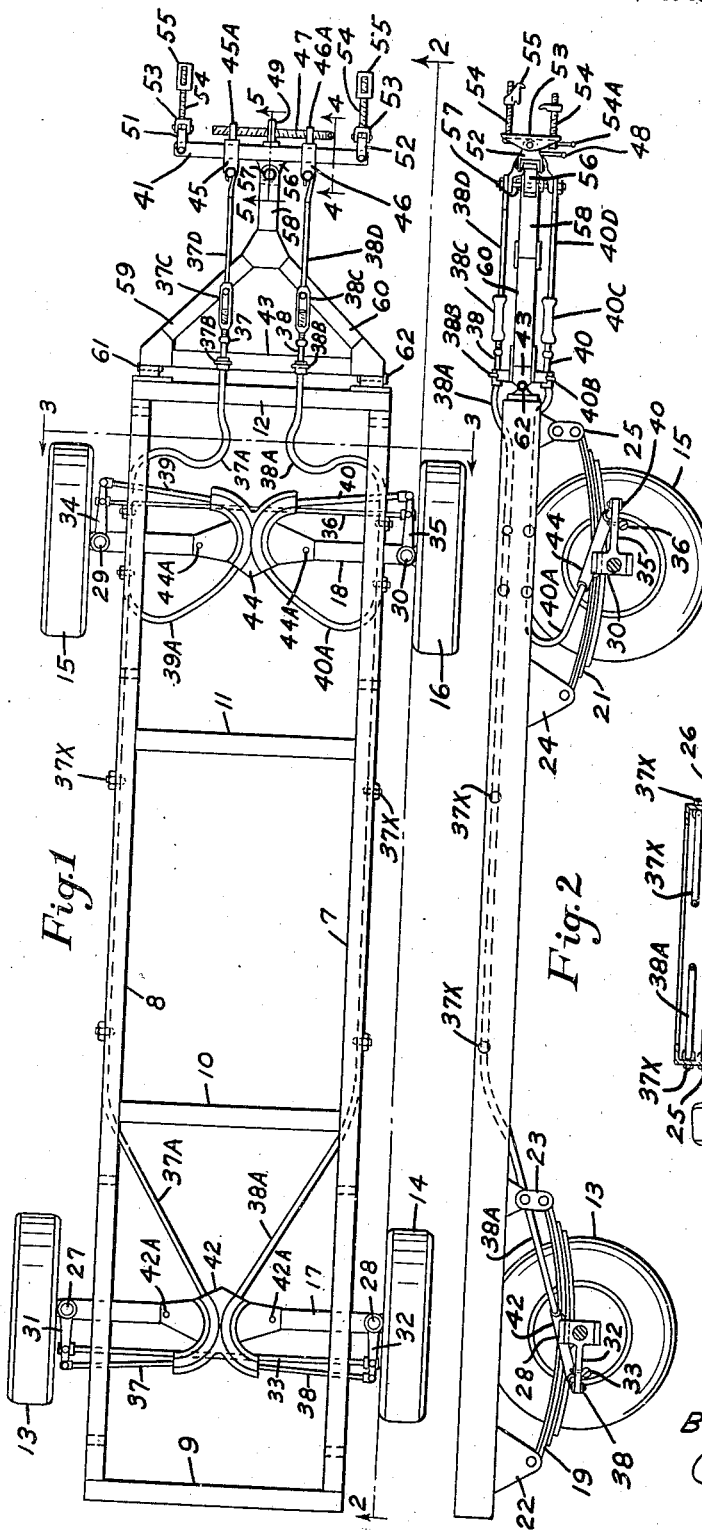
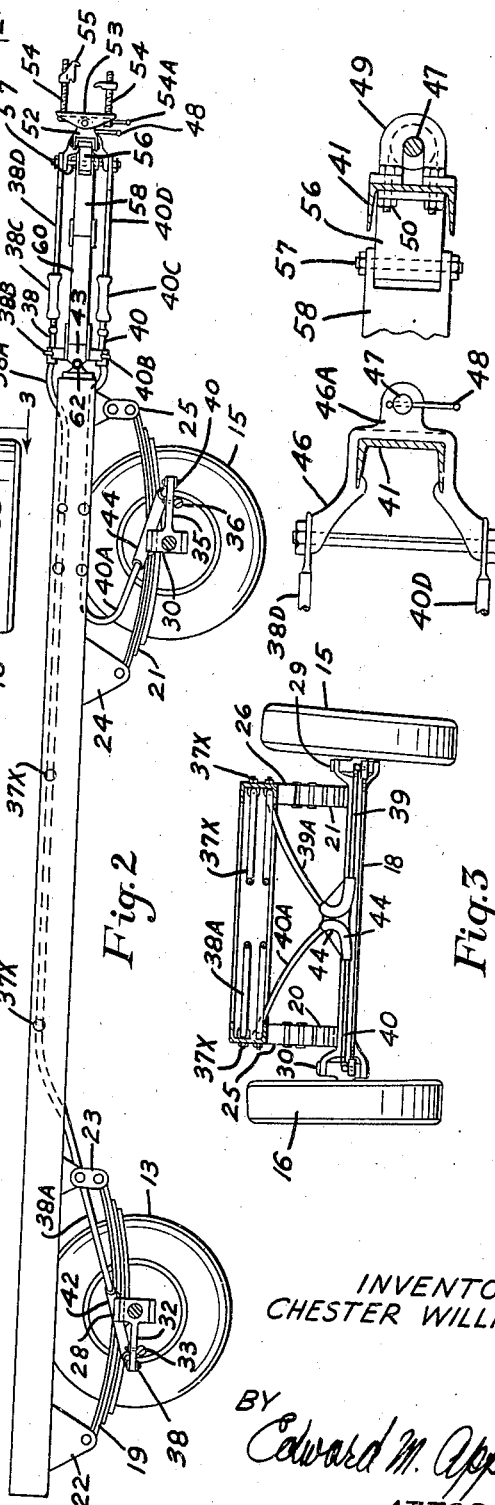
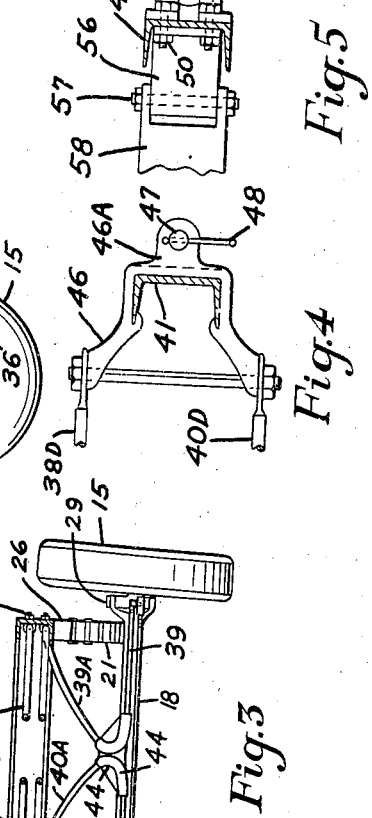
INVENTOR
CHESTER WILLIAMS
BY
*Edward M. Apple*
ATTORNEY Patented Mar. 11, 1947

2,417,338

UNITED STATES PATENT OFFICE 2,417,338

FOUR WHEEL TRAILER

Chester Williams, Ypsilanti, Mich.

Application January 25, 1946, Serial No. 643,278

3 Claims. (Cl. 280—33.55)

The invention relates to automobile trailers, and has particular reference to a four wheel trailer towing and steering mechanism.

An object of the invention is the provision of a four wheel trailer, which has positive steering on all wheels.

Another object of the invention is the provision of a four wheel trailer with steering mechanism adapted to cause the trailer to positively track the towing vehicle.

Another object of the invention is the provision of a four wheel trackable trailer having means for adjusting its turning radius, so that it will track any length of towing vehicle.

Another object of the invention is the provision of a four wheel trailer having means for positively steering all of the wheels, whereby the front wheels turn in one direction and the rear wheels turn in the opposite direction.

Another object of the invention is the provision of a four wheel trailer which is constructed and arranged to permit direct backing, and the turning of sharp corners.

Another object of the invention is the provision of a four wheel positive steer trailer, which is constructed and arranged so that frame deflection cannot hamper wheel direction.

Another object of the invention is the provision of a device having a trailer attachment suitable for use with any towing vehicle such as auto, tractor, or truck.

The foregoing and other objects and advantages of the invention will appear as the description proceeds, reference being made from time to time to the accompanying drawings forming part of the within disclosure, in which drawings:

Fig. 1 is a plan view of a device embodying the invention.

Fig. 2 is a view, partly in section, taken on the line 2—2 of Fig. 1.

Fig. 3 is a section taken on the line 3—3 of Fig 1.

Fig. 4 is a section taken on the line 4—4 of Fig. 1.

Fig. 5 is a section taken on the line 5—5 of Fig. 1.

Referring now more particularly to the drawings, it will be understood that in the embodiment herein disclosed, the reference characters 7, 8, 9, 10, 11, and 12 indicate the members comprising the trailer frame, which is mounted on the wheels 13, 14, 15, and 16 through the axles 17 and 18, springs 19, 20, and 21, and the spring supports 22, 23, 24, 25, and 26.

The wheels 13, 14, 15, and 16 are supported on spindles which pivot on the axles 17 and 18 as at 27, 28, 29, and 30. The rear spindle arms 31 and 32 are connected by the tie rod 33, and the front spindle arms 34 and 35 are connected by the tie rod 36, so that the front and rear wheels move in pairs.

It will be noted that the spindle arms on the front axle are directed forwardly and the spindle arms on the rear axle are directed rearwardly.

Secured to the spindle arms 31, 32, 34, and 35 are cables 37, 38, 39, and 40, which are in turn connected, as hereinafter described, to the draw beam 41.

The cables 37, 38, 39, and 40 are adapted to slide through flexible sheathings 37A, 38A, 39A, and 40A. These sheathings are of conventional construction and consist of layers of wire and rubber encased in a spiral spring.

The rear ends of the sheathings 37A and 38A are secured in a tunnel member 42, which in turn is secured to the rear axle 17 as at 42A, and the front ends of the sheathings are secured as at 37B and 38B to the top of the cross member 43 comprising part of the towing hitch hereinafter described. The sheathings are attached intermediate their ends to the frame of the trailer as at 37X.

The rear ends of the sheathings 39A and 40A are secured in the tunnel member 44, which in turn is secured to the front axle 18 as at 44A. The front ends of the sheathings 39A and 40A are secured as at 40B (Fig. 2) to the under side of the member 43.

The front ends of the cables 37, 38, 39, and 40 are provided with turn buckles 37C, 38C, 39C, and 40C, which engage the ball end rods 37D, 38D, 39D, and 40D, which in turn are secured to the members 45 and 46, which are slidably mounted on the draw beam 41.

The members 45 and 46 are provided with threaded extension members 45A and 46A which are adapted to engage a threaded rod 47, which is adapted to be rotated by means of the lever 48 (Fig. 4). The threaded rod 47 extends through a threaded thrust box 49 (Fig. 5) which is secured to the draw beam 41 by any suitable means such as nuts and bolts 50.

The members 45 and 46 may be moved inwardly or outwardly on the draw beam 41, by the rotation of the threaded rod 47, to effect further adjustment in the lengths of the cables.

At the ends of the draw beam 41 are clevises 51 and 52, each of which supports a member 53 (Fig. 2) which is provided with upper and lower threaded openings adapted to engage the threaded rods 54, on which are threaded clamps 55, which are adapted to engage the bumper or some other part of the towing vehicle. The rods 54 are adapted to be rotated by means of the slidable pins 54A.

Secured to the rear face of the draw beam 41 (Fig. 5) is a member 56, to which is pivoted as at 57 the tow bar 58, which has diverging arms 59 and 60, to which is secured the cross member 43 previously described.

The towing elements 43, 59, and 60 are pivoted to the trailer frame as at 61 and 62.

The operation of the device is as follows:

The draw beam 41 is secured to the rear bumper, or other member of the towing vehicle, by attaching thereto the clamps 55 which may be drawn up tight by means of the threaded members 54. The wheels are then aligned and the cables are adjusted to the proper length to provide the turning radius desired.

Final adjustment of the towing arrangement may be accomplished by moving the cable supporting members inwardly or outwardly by means of the threaded rod 47. When the cables are adjusted to proper length, the device is ready for operation.

It is obvious that as the towing vehicle turns in one direction or the other, the draw beam 41 will pivot about the member 57, and that portion of the draw beam which is moving away from the trailer will affect the movement of the cables on that side in the same direction, causing the corresponding movement of the spindle arms to which the cables are attached.

Inasmuch as the spindle arms on the front wheels extend forwardly, and the spindle arms on the rear wheels extend rearwardly, the wheels affected by the cables on one side will move in opposite directions, and inasmuch as the front spindles of the front wheels are tied together, and the spindles of the rear wheels are tied together, all four wheels will move simultaneously under the influence of the movement of said cables. The turning of the draw beam 41 in the opposite direction will affect the movement of all wheels in a corresponding opposite direction.

The operation just described effects the perfect tracking of the trailer and towing vehicle. When the towing vehicle is backed up, the action just described is reversed, again effecting the positive tracking of the leading and following vehicle.

Having described my invention, what I claim and desire to secure by Letters Patent is:

1. A towing and steering mechanism for a four wheel trailer comprising in combination, a draw beam, universally adjustable elements at each end of said draw beam for connecting same to a towing vehicle, cable attaching members slidable on said draw beam, a thrust member secured to said draw beam, a rod in threaded engagement with said thrust member and said cable supporting members, pairs of cables secured to each of said cable supporting members, each pair of cables being adapted to steer the wheels on one side of said trailer, a rearwardly extending member on said draw beam, and a draw bar pivoted to said last-named member and having divergent arms pivotally secured to the frame of said trailer.

2. The combination defined in claim 1, in which said cables are provided with means for adjusting their length.

3. The combination defined in claim 1, in which said cables are provided with flexible sheathings, the rear ends of said sheathings being fixed to abutment members positioned near the wheels of the trailer, the front ends of said sheathings being secured to a cross member extending between said divergent arms.

CHESTER WILLIAMS.

REFERENCES CITED

The following references are of record in the file of this patent:

UNITED STATES PATENTS

| Number | Name | Date |
|---|---|---|
| 1,925,712 | Campbell | Sept. 5, 1933 |
| 2,189,453 | Struensee | Feb. 6, 1940 |
| 2,206,991 | Williams et al. | July 9, 1940 |
| 2,330,557 | Collis | Sept. 28, 1943 |
| 2,338,934 | Gross | Jan. 11, 1944 |